Patented Nov. 7, 1922.

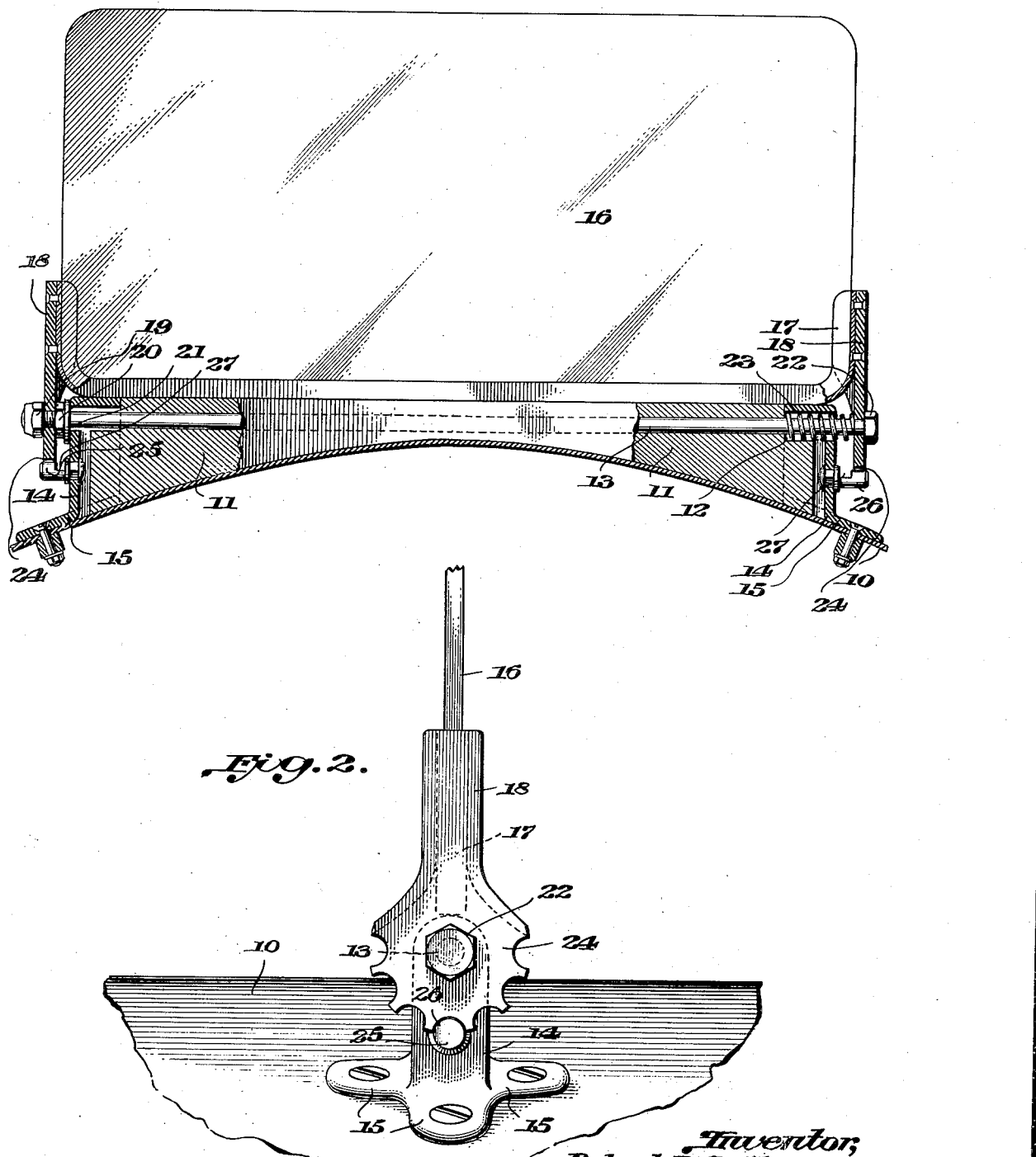

1,434,604

UNITED STATES PATENT OFFICE.

ROBERT B. GALLOWAY, OF DETROIT, MICHIGAN, ASSIGNOR TO PACKARD MOTOR CAR COMPANY, OF DETROIT, MICHIGAN, A CORPORATION OF MICHIGAN.

WINDSHIELD.

Application filed March 28, 1919. Serial No. 285,327.

*To all whom it may concern:*

Be it known that I, ROBERT B. GALLOWAY, a citizen of the United States, and resident of Detroit, Wayne County, State of Michigan, have invented certain new and useful Improvements in Windshields, of which the following is a specification.

This invention relates to aircraft and particularly to a windshield therefor.

One object of the invention is to provide a windshield particularly adapted for aircraft and which may be readily adjusted to different positions of angularity relative to a vertical plane, with one hand of the aviator.

Another object of the invention is to provide a windshield adapted to be locked firmly in various positions of adjustment and capable of release from such locking means by a lateral movement of the windshield.

With the above objects and others in view, the invention is embodied in preferable form in the construction hereinafter described and illustrated in the accompanying drawings, in which—

Fig. 1 is a front view in elevation, partly in vertical section, showing the improved windshield applied to the fuselage of an aircraft; and Fig. 2 is an end view.

Referring to the drawings, 10 indicates the fuselage of an aircraft from which rises an enlargement or elevated body structure 11 having bearings 12 for a transversely extending shaft 13. Brackets 14 co-operate with the body structure 11 in forming said bearings and have feet 15 which are fastened to the fuselage. The glass of the windshield is indicated by 16 and it is mounted in a frame 17 having vertical, depending arms 18. At one end of the shaft or rod 13, one arm 18 is pivoted by means of a suitable opening on said shaft between nuts 19 and 20, the latter bearing against a washer 21 surrounding the shaft, and pressed against the bracket 14. The arm 18 at the other end of the shaft also has a suitable opening through which the shaft extends and it is prevented from escape beyond the end of the shaft by means of the nut 22 on one side thereof. At the other side of the arm the same is pressed against by a spiral spring 23, the opposing end of which spring bears against the supporting body in which the shaft is carried. The spring thus tends to press the windshield to the right and maintain it in normal position. In such position the windshield is adapted to be locked against movement around the shaft as a center. To this end each of the depending arms 18 is provided with a toothed sector 24. The recesses between the teeth in the periphery of this sector are adapted to engage a head 25 of a stud 26 which stud is provided with a cutaway portion 27 between the head 25 and the bracket 14 to which the stud is riveted or otherwise secured.

In the operation of the device the spring 23 normally presses the windshield to the right retaining one of the notches of the sector 24 in engagement with the head 25 of pin 26. To adjust the windshield to a different position of angularity it is merely necessary to press the windshield longitudinally to the left against the force of the spring sufficiently to carry the arm 18 and its sector out of alignment with the head 25 so as to release the teeth from the said head whereupon the shield may be swung to the desired new adjustment and then moved back again to the right to engage the notch in the sector corresponding to the new angle with the head 25.

Having thus described my invention, what I claim and desire to secure by Letters Patent is:—

In a windshield structure, the combination with a support, of a windshield having a rod extending longitudinally thereof and mounted in said support, a toothed sector at each end of said windshield, a detent mounted on said support adjacent each of said sectors and adapted to positively retain the windshield in adjusted position, and means for yieldingly retaining said windshield in one position longitudinally of said rod whereby said windshield may be moved longitudinally out of locking position with said detent.

In testimony whereof I affix my signature.

ROBERT B. GALLOWAY.